UNITED STATES PATENT OFFICE.

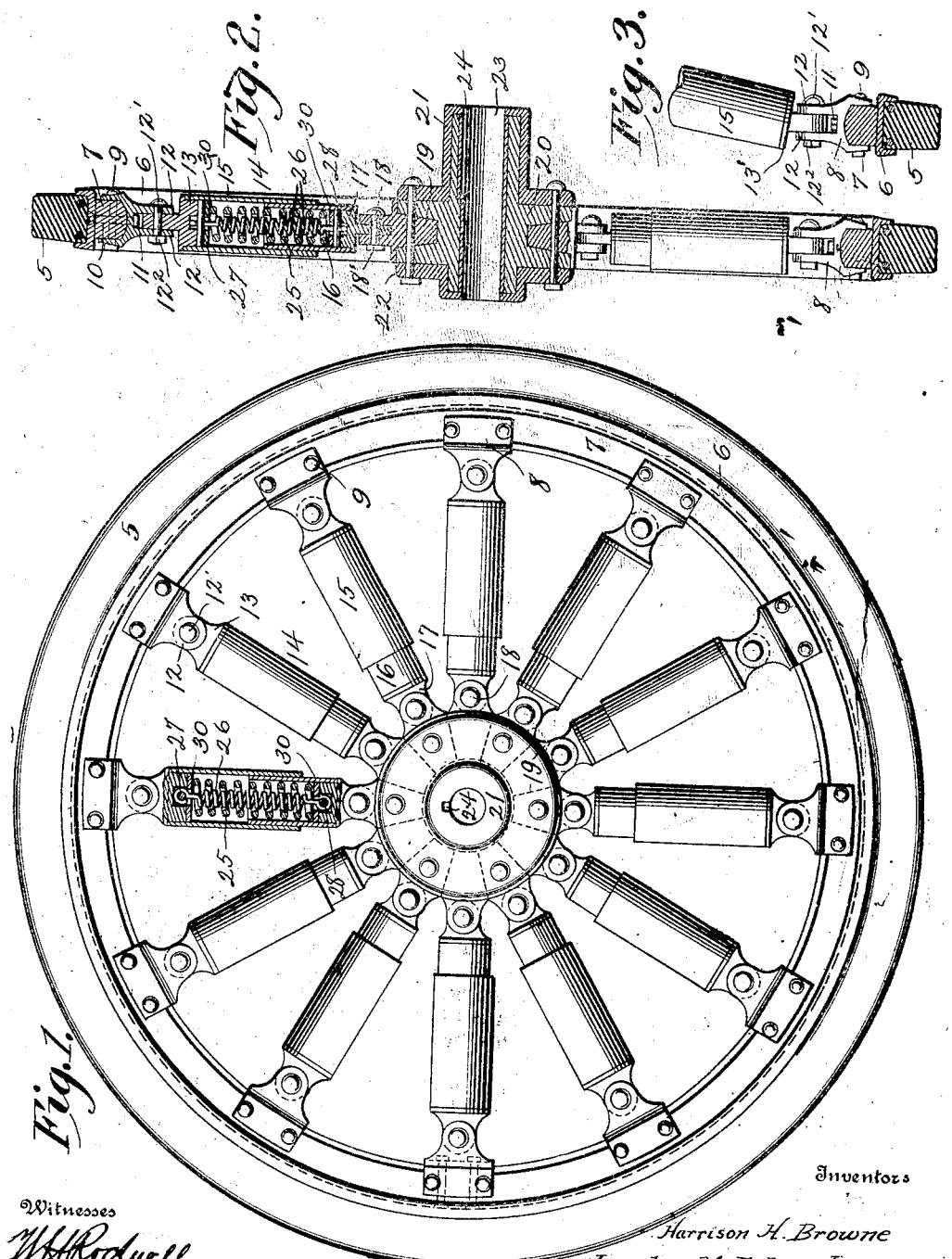

HARRISON HOPPER BROWNE AND JOSEPHUS MARION ASHER, JR., OF SAN DIEGO, CALIFORNIA.

RESILIENT WHEEL.

950,761.  Specification of Letters Patent.  Patented Mar. 1, 1910.

Application filed December 30, 1908. Serial No. 470,031.

*To all whom it may concern:*

Be it known that we, HARRISON HOPPER BROWNE and JOSEPHUS MARION ASHER, Jr., citizens of the United States, residing at San Diego, in the county of San Diego and State of California, have invented certain new and useful Improvements in Resilient Wheels; and we do hereby declare the following to be a full, clear, and exact description of the invention, such as will enable others skilled in the art to which it appertains to make and use the same.

This invention relates to resilient vehicle wheels, the object of the invention being to provide an improved structure of this character, one that will be neat in appearance and will efficiently cushion the vehicle to which it is applied by means of springs, thereby rendering unnecessary the use of pneumatic tires.

Further objects and advantages of the invention will be set forth in the detailed description which now follows.

In the accompanying drawing, Figure 1 is a side elevation of a vehicle wheel constructed in accordance with the invention, one of the telescopic spokes thereof being shown in section. Fig. 2 is a transverse vertical section of said wheel with one of the telescopic spokes shown in elevation, and Fig. 3 is a detail view illustrating a modified form of spoke which may be employed when it is desired to have the wheel a dished one.

Like numerals designate corresponding parts in all of the figures of the drawing.

Referring to the drawing, the numeral 5 designates a solid rubber tire which is carried by a rim 6. This rim is in turn carried by the felly 7 of the wheel. Bifurcated clips 8 embrace the felly and are secured thereto by bolts or like fastening devices 9. Vertically disposed bolts 10 pass through the rim and through the felly and have nuts 11 upon their inner ends, these bolts serving not only to bind the rim and felly together but also serving to aid in retaining the clips 8 in position.

Pivoted between jaws 12 of the clips 8 and upon bolts 12' are the caps 13 of spokes 14. These spokes comprise sleeves 15, and cylinders 16, the sleeves 15 being of larger diameter than the cylinders 16 and sliding thereon. The caps 13 may be secured to the sleeves 15 in any desired manner, such as by brazing for instance and caps 17 are in like manner secured to the cylinders 16. The inner ends of the caps 17 are pivoted by means of bolts 18 to blocks 19, these blocks being held in position in a hub 20 by plates 21 and bolts 22. If desired a bearing sleeve 23 may be inserted in the hub and this sleeve may be provided with a key-way 24 for the purpose of keying the sleeve to the driving shaft of an automobile when the wheel is employed as a driving wheel. In Fig. 3 the parts are of the same structure except that the caps 13' are so arranged that their bearing portions that receive the bolts 12' lie at an angle in such manner that the wheel will be a dished wheel. It is a well known fact that the dishing of wheels adds materially to their strength and ordinarily we prefer to make the wheel in this manner but the wheel may be constructed as shown in Fig. 2 as an alternative construction if desired.

Disposed within the telescopic spokes are springs 25, and 26. The springs 25 bear between caps 13 and 17 and normally tend to force said caps away from each other while the springs 26 are positively connected at their ends to said caps by means of pins 27 and 28, and tend to draw said caps toward each other.

The operation of the device is as follows: When the strain is brought to bear upon the hub by the weight of the vehicle, the springs 25 beneath said hub tend to resist the downward movement of the hub by pressing against the caps 13 and 17 while the springs 26 above said hub likewise tend to resist such downward movement by their endwise pull which tends to pull said caps toward each other. This results in producing a structure which is particularly well balanced. Any movement of the hub with relation to the rim must be a gradual one, thereby avoiding the certain jerks and jars that would result if a single spring acting in only one direction were employed. It will also be seen that the springs are protected from the weather and that it is impossible for dirt or grit to get to them. This lengthens their life and since they are entirely concealed from view, renders the wheel a more sightly one.

In the drawing, the numerals 30 designate washers which are disposed between the ends of the springs 25 and the caps. These washers not only preserve the caps from wear but provide means for truing up the wheel. If for instance one of the springs 25 becomes weakened and is not as strong as the remaining springs 25, by adding one or more washers 30, this defect may be remedied. Since the spokes are pivoted both at the rim and hub, they may change their tangential position. This is found to be of advantage when an automobile in which the wheel is used, is being started. It is particularly true when the wheel is employed as a driving wheel for it permits a slight movement of the hub with relation to the rim after the engine is thrown into gear with the driving shaft, and interposes a spring cushion between the driving shaft and the rim of the wheel. If this movement is not desired, it is only necessary to tighten up on the nuts $12^2$ and $18'$ carried by bolts $12'$ and 18. This will bind the parts together in such manner that the connection is no longer a pivoted one but is a rigid one.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth but includes within its purview such changes as may be made within the scope of the appended claim.

Having described our invention, what we claim is:

In a device of the character described, the combination with a felly, a rim and a tire, of a hub, a plurality of bifurcated members secured to the rim, a plurality of bifurcated members secured to the hub, a plurality of telescopic spokes each of said spokes comprising a pair of tubular sections having telescopic engagement with each other, caps secured within the ends of the tubular sections of the spokes, reduced extensions formed upon said caps, said extensions entering the bifurcated members of the rim and the hub, means for pivotally connecting said extensions in said bifurcated members, a pair of springs in each of said spokes, means for positively connecting the ends of one of said springs to said caps to thereby draw the tubular sections of the spoke together, a washer bearing against one of said caps and the other of said springs bearing between said washer and the other of said caps.

In testimony whereof, we have affixed our signatures, in presence of two witnesses.

HARRISON HOPPER BROWNE.
JOSEPHUS MARION ASHER, Jr.

Witnesses:
G. CONNORS,
M. SCHAFFNET.